United States Patent
Sato et al.

(10) Patent No.: US 7,512,147 B2
(45) Date of Patent: Mar. 31, 2009

(54) METHOD OF RESERVING NETWORK BANDWIDTH RESOURCES, AND COMMUNICATIONS SYSTEM AND NETWORK DEVICE USING THE SAME

(75) Inventors: Masahiro Sato, Kawasaki (JP); Jun Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 11/393,724

(22) Filed: Mar. 31, 2006

(65) Prior Publication Data

US 2007/0076755 A1    Apr. 5, 2007

(30) Foreign Application Priority Data

Sep. 30, 2005    (JP) .............................. 2005-285984

(51) Int. Cl.
*H04L 12/403* (2006.01)
(52) U.S. Cl. .................... 370/452; 370/216; 370/222; 370/468; 370/449; 370/252
(58) Field of Classification Search ................ 370/468, 370/216–228, 403–409, 449, 452
See application file for complete search history.

(56) References Cited

U.S. PATENT DOCUMENTS

| | | | | |
|---|---|---|---|---|
| 5,469,428 A * | 11/1995 | Tokura et al. | ............... | 370/224 |
| 6,801,496 B1 * | 10/2004 | Saleh et al. | ................. | 370/221 |
| 6,952,397 B2 * | 10/2005 | Mor et al. | ................... | 370/223 |
| 7,002,907 B1 * | 2/2006 | Chen et al. | ................... | 370/222 |
| 7,369,514 B1 * | 5/2008 | Peng et al. | ................... | 370/258 |
| 7,436,852 B2 * | 10/2008 | Nam et al. | ................... | 370/468 |
| 2002/0181508 A1 * | 12/2002 | Mo et al. | ..................... | 370/477 |
| 2003/0031126 A1 * | 2/2003 | Mayweather et al. | ....... | 370/223 |
| 2006/0050665 A1 * | 3/2006 | Bruckman | ................... | 370/329 |
| 2008/0310299 A1 * | 12/2008 | Saleh et al. | ................. | 370/221 |

OTHER PUBLICATIONS

Patent Abstracts of Japan, Publication No. 2003-249940, Published Sep. 5, 2003.
Patent Abstracts of Japan, Publication No. 2003-324473, Published Nov. 14, 2003.
U.S. Appl. No. 11/191,071, filed Jul. 28, 2005.

* cited by examiner

*Primary Examiner*—Taghi T. Arani
*Assistant Examiner*—Jenkey Van
(74) *Attorney, Agent, or Firm*—Staas & Halsey LLP

(57) ABSTRACT

A communications system whose bandwidth resources can be used more efficiently by reserving them on an individual path basis. Upon receipt of a bandwidth reservation message, a path setup initiator examines the message and thereby recognizes that the local station device is the egress node of a specified logical network segment. It then consults a topology database to retrieve hop counts of the source station device, which reveals, for example, that a first ringlet has a smaller hop count than a second ringlet. The path setup initiator sends a working path setup message to the ingress network device over the first ringlet, as well as a protection path setup message to the same ingress device over the second ringlet. Upon receipt of those messages, a bandwidth reservation unit reserves a working path bandwidth on the second ringlet, as well as a protection path bandwidth on the first ringlet.

13 Claims, 13 Drawing Sheets

FIG. 8A

T1 BANDWIDTH TABLE IN STATION S1

(Ringlet0)

| VLAN | A0 BANDWIDTH |
|---|---|
|  |  |
|  |  |

(Ringlet1)

| VLAN | A0 BANDWIDTH |
|---|---|
| 1 | 50 |
| 2 | 100 |

FIG. 8B

T2 LINK TABLE IN STATION S1

| LINK | VLAN (WORKING) | VLAN (PROTECTION) | RINGLET |
|---|---|---|---|
| 0 |  | 1, 2 | 0 |
| 0 |  |  | 1 |
| 1 |  | 1, 2 | 0 |
| 1 |  |  | 1 |
| 2 |  | 1 | 0 |
| 2 | 2 |  | 1 |
| 3 |  | 2 | 0 |
| 3 | 1 |  | 1 |
| 4 |  | 1, 2 | 0 |
| 4 |  |  | 1 |
| 5 |  | 1, 2 | 0 |
| 5 |  |  | 1 | k0 → row 1; k1 → row 6; k2 → row 7

| No. | CoS (class of service) | | PRIORITY LEVEL | QoS (quality of service) | | FAIRNESS ELIGIBLE TRAFFIC |
|---|---|---|---|---|---|---|
| | Class | Subclass | | Delay | Bandwidth | |
| 1 | Class A | Subclass A0 | High | Min | Non-reusable | No |
| 2 | | Subclass A1 | ↑ | Small | | |
| 3 | Class B | ClassB-CIR | ↑ | Medium | Reusable | |
| 4 | | ClassB-EIR | ↑ | Large | Best Effort | Yes |
| 5 | Class C | ClassC-EIR | Low | | | |

FIG. 11
*PRIOR ART*

METHOD OF RESERVING NETWORK BANDWIDTH RESOURCES, AND COMMUNICATIONS SYSTEM AND NETWORK DEVICE USING THE SAME

CROSS-REFERENCE TO RELATED APPLICATIONS

This application is based upon and claims the benefits of priority from the prior Japanese Patent Application No. 2005-285984, filed on Sep. 30, 2005, the entire contents of which are incorporated herein by reference.

BACKGROUND OF THE INVENTION

1. Field of the Invention

The present invention relates to a communications system, a network device, and a method of reserving bandwidth resources. More particularly, the present invention relates to a Resilient Packet Ring communication system that transports packets over a redundant ring network. The present invention also relates to a network device, as well as to a method of reserving bandwidth resources, for use in an RPR system.

2. Description of the Related Art

Ring network systems based on the Synchronous Optical Network (SONET) or Synchronous Digital Hierarchy (SDH) standards have been the mainstream architecture of long-haul backbones for wide-area network service. Another technology called "Resilient Packet Ring" (RPR) is gaining interest in these years as an alternative to SONET/SDH systems. RPR is a new data transmission technique currently in the process of standardization by an IEEE committee. The IEEE 802.17 RPR standard offers protocols of Media Access Control (MAC) sub-layer, part of layer 2, like the Ethernet (registered trademark of Xerox Corporation) in LAN environments. RPR technology takes advantage of a ring topology, combined with an existing technique for layer 1.

RPR assumes the use in a metropolitan area network (MAN). It is possible to construct an RPR network on an existing backbone with a hierarchy of transmission rates, such as Optical Carrier (OC-n) of SONET networks or Synchronous Transport Module (STM-n) of SDH networks. 10-Gigabit Ethernet (10 GbE) may also be used as another option for layer 1 (physical layer) architecture. Such existing ring networks carry IEEE802.17 MAC frames (or RPR frames), thereby realizing "RPR over SONET/SDH," "RPR over GbE," or the like.

FIG. 10 provides an overview of an RPR network. This RPR network 100 includes four stations S1 to S4 and fiber optic links interconnecting those stations in a dual ring topology. Part of data traffic traveling over the ring network is dropped (i.e., split off) to tributaries at those stations S1 to S4. The stations S1 to S4 also allow incoming data traffic from tributaries to be added to the main data traffic on the ring.

The dual RPR ring consists of two unidirectional ringlets, Ringlet0 and Ringlet1, to transport packets in opposite directions. In the example of FIG. 10, Ringlet0 runs counterclockwise while Ringlet1 runs clockwise. Ringlet0 and Ringlet1 serve as a working system and a protection system, respectively. RPR networks transport and deliver data in "packets," whereas SONET/SDH networks do the same in "streams" each accommodating a plurality of OC or STM channels.

The RPR architecture permits packets to have different classes for bandwidth control purposes. FIG. 11 enumerates RPR classes of service. Specifically, there are three class definitions: Class A, Class B, and Class C. Class A offers bandwidth-guaranteed service using previously reserved bandwidth resources for packet transport. This class of service minimizes end-to-end delays and jitters.

More specifically, Class A is divided into two subclasses A0 and A1. Of all classes, Class A0 packets enjoy the highest priority. Bandwidth reserved for Class A0 is for exclusive use by Class A0 services; that is, two or more Class A0 paths can use the same reserved bandwidth, but other classes of service cannot.

Class B is also divided into two subclasses: Class B-CIR (Committed Information Rate) and Class B-EIR (Excess Information Rate). Both Class A1 and Class B-CIR provide bandwidth-guaranteed services, but their reserved bandwidth resources may be used by other classes (i.e., they are for non-exclusive use). Class B-EIR and Class C (Class C-EIR), on the other hand, do not guarantee the bandwidth that they claim to offer. Instead, those classes offer best-effort transport service using remaining bandwidth.

The system operator provisions, if necessary, a new Class A0 bandwidth for a station, taking into consideration every existing Class A0 path on each ring. The operator performs this task by using his/her terminal console to send bandwidth configuration commands to that station. The receiving station then notifies every peer station of the provisioned bandwidth, so that the Class A0 bandwidth for that station will be reserved throughout the ring network.

FIG. 12 shows a conventional way of reserving bandwidth. The illustrated RPR network 110 is formed from six stations S1 to S6 interconnected by fiber optic links in a dual ring topology. The two ringlets, named Ringlet0 and Ringlet1, transport packets in the counterclockwise and clockwise directions, respectively.

Suppose now that a new path P1 has to be added to transport Class A0 packets from station S3 to station S4 at 100 Mbps. The system operator enters commands to his/her terminal console 103 to configure the ingress station S3, so as to provision a 100-Mbps bandwidth resource for the new path P1. The provisioning of this 100-Mbps bandwidth is reported to all other stations, thus reserving 100 Mbps for Class A0 service on both Ringlet0 and Ringlet1.

For an example of such an existing RPR-based technique, see Japanese Patent Application Publication No. 2003-249940, paragraph numbers 0008 to 0010, FIG. 1. This publication discloses a technique for realizing dynamic multicast routing control with a reduced signal processing workload.

One problem of the above-described conventional techniques for RPR bandwidth reservation is their inefficient use of bandwidth resources. Specifically, the existing techniques reserve extra bandwidth on both Ringlet0 and Ringlet1 when adding a new path P for Class A0 traffic. FIG. 13 shows this problem with conventional bandwidth reservation. In the illustrated RPR network 110, two hosts H3 and H4 are connected to stations S3 and S4, respectively. These hosts H3 and H4 belong to a first virtual LAN (VLAN) domain, VLAN1. VLAN is a logical network segment in which stations can communicate with each other as if they were in a physically closed network. There is another host H2 connected to station S2. The hosts H2 and H3 belong to a second virtual LAN domain, VLAN2, meaning that they can communicate with each other as if they were in another closed network.

VLAN1 uses a path P1 from station S3 to station S4, while VLAN2 uses another path P2 from station S2 to station S3. Suppose now that the first path P1 needs 100 Mbps for its Class A0 traffic, and that the second path P2 needs 50 Mbps for its Class A0 traffic. Suppose also that the ringlets have a capacity of 100 Mbps for each.

Both VLAN1 path P1 and VLAN2 path P2 are used as working paths. Since P1 does not overlap with P2, the above bandwidth requirements are supposed to be satisfied theoretically. That is, the network must be able to transport packets from S3 to S4 at 100 Mbps concurrently with another packet traffic from S2 to S3 at 50 Mbps.

The conventional bandwidth reservation techniques, however, allocates 100-Mbps bandwidth, not only to the first path P1 between S3 and S4, but also to the other links on Ringlet0 and Ringlet1, including the second path P2 between S2 and S3. The second path P2 with a capacity of 50 Mbps cannot be established because the bandwidth resource of the link between S2 and S3 has already been exhausted.

As can be seen from the above discussion, the conventional network system allocates its bandwidth on an entire ring basis, rather than reserving path bandwidth on an individual link basis. Such inefficient use of bandwidth spoils operability of the ring network.

SUMMARY OF THE INVENTION

In view of the foregoing, it is an object of the present invention to provide an RPR communications system whose bandwidth resources can be used more efficiently by reserving them on an individual path basis.

It is another object of the present invention to provide an RPR network device which enables more efficient use of available bandwidth resources by reserving them on an individual path basis.

It is yet another object of the present invention to provide a bandwidth reservation method for an RPR network which enables more efficient use of available bandwidth resources by reserving them on an individual path basis.

To accomplish the first object stated above, the present invention provides a communications system transporting data over a redundant ring network. The ring network is formed from first and second ringlets running in opposite directions. The communications system has a plurality of station devices and a plurality of transmission media interconnecting the station devices to form the first and second ringlets.

Each station device has a bandwidth reservation initiator that sends out a bandwidth reservation message in both ring directions. This bandwidth reservation message contains a source identifier, a logical network identifier, and a bandwidth reservation value to announce how much bandwidth should be reserved for a network path. Also contained in each station device is a topology database that manages hop counts of other station devices on the ring network. The hop counts include first hop counts measured along the first ringlet and second hop counts measured along the second ringlet. A path setup initiator, another elements of the station devices, examines a source identifier and logical network identifier in a bandwidth reservation message received from other station devices, thereby recognizes that the local station device is an egress node of a logical network segment specified in the received bandwidth reservation message. It then consults the topology database to retrieve the first and second hop counts of the source station device of the received bandwidth reservation message. If the retrieved first hop count is smaller than the retrieved second hop count, the path setup initiator sends a working path setup message back to the source network device over the first ringlet, as well as a protection path setup message to the same source device over the second ringlet. Each station device further employs a bandwidth reservation unit, which reserves bandwidth on the second ringlet to establish a working path of the specified logical network segment when a working path setup message is received from the first ringlet. It also reserves bandwidth on the first ringlet to establish a protection path of the specified network when a protection path setup message is received from the second ringlet.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 8A and 8B show a bandwidth table and a link table.

FIG. 11 shows RPR classes of service.

DESCRIPTION OF THE PREFERRED EMBODIMENTS

Figure 1:
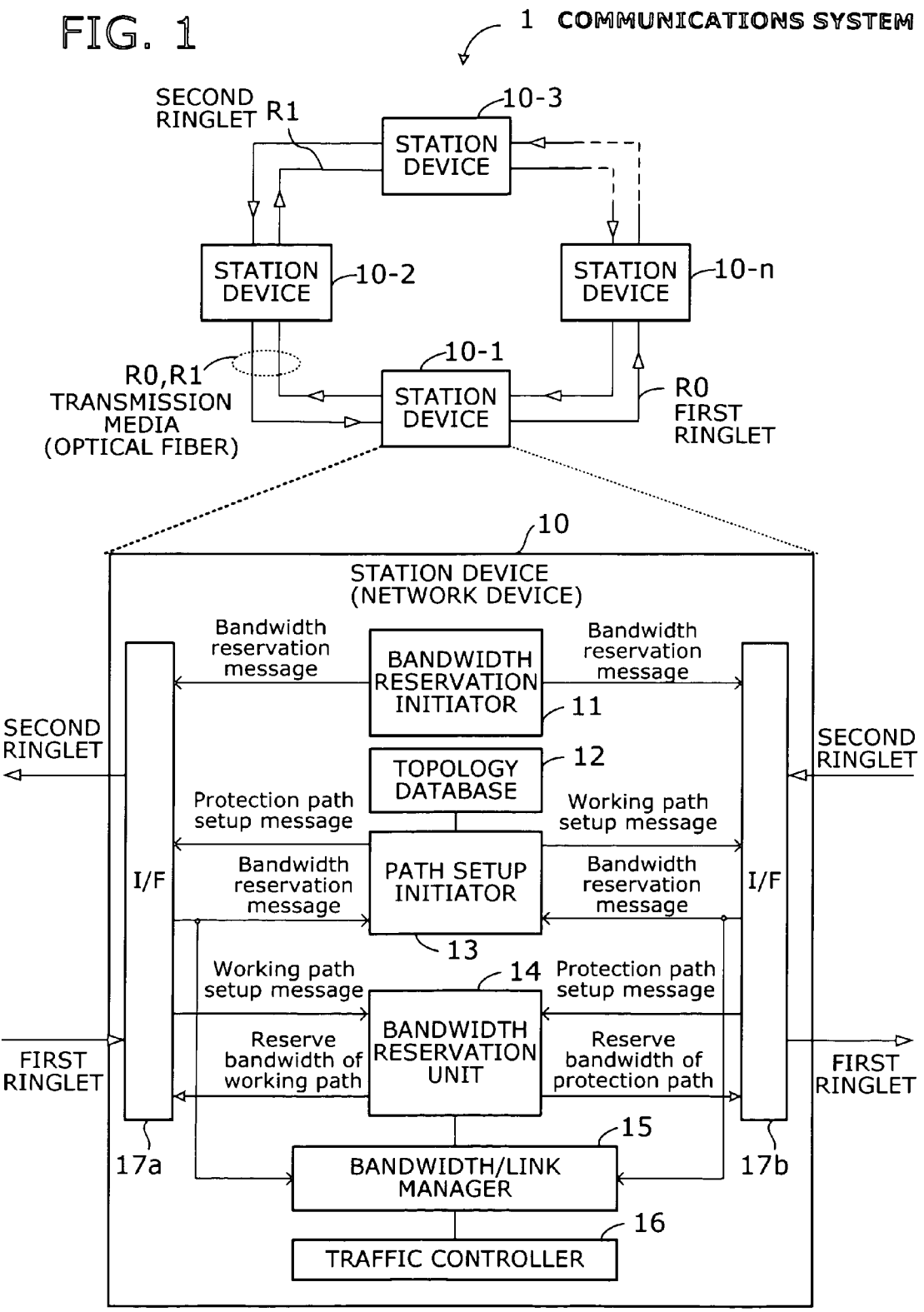
FIG. 1 is a conceptual view of a communications system according and embodiment of to the present invention.

Preferred embodiments of the present invention will be described below with reference to the accompanying drawings, wherein like reference numerals refer to like elements throughout.

FIG. 1 is a conceptual view of a communications system according to an embodiment of the present invention. This communications system 1 is formed from a plurality of station devices (also referred to as "network devices") 10-1 to 10-n (collectively referred to by the reference numeral "10"). Those station devices 10 are interconnected by fiber optic transmission media in a redundant ring topology to provide RPR communication service. The outer and inner rings are referred to as first and second ringlets R0 and R1. Each station device 10 has, among others, a bandwidth reservation initiator 11, a topology database 12, a path setup initiator 13, a bandwidth reservation unit 14, a bandwidth/link manager 15, a traffic controller 16, and I/O interfaces (I/F) 17a and 17b.

The I/O interface 17a shown on the left-hand side of FIG. 1 handles incoming data traffic from the first ringlet as well as outgoing data traffic to the second ringlet. The I/O interface 17b on the other side handles incoming data traffic from the second ringlet and outgoing data traffic to the first ringlet.

The bandwidth reservation initiator 11 sends out a bandwidth reservation message to both ringlets attached to the station device 10. This bandwidth reservation message contains a source identifier, a logical network identifier, and a bandwidth reservation value, so as to announce how much bandwidth should be reserved for a network path. Specifically, the logical network identifier may be a VLAN identifier (VLAN ID) in the case that the network path is of a VLAN domain. In the case of a multi-protocol label switching (MPLS) network, its MPLS label will be included as a logical network identifier. The following description will assume VLANs, and thus the bandwidth reservation messages are supposed to contain a VLAN identifier in their logical network identifier fields.

The topology database 12 manages hop counts measured from the present station device 10 to other station devices on the ring. The hop count refers to the number of station-to-station links that have to be traversed to reach a remote station device. Since the number of intervening links depends on which ring direction to follow, the hop counts of a station device actually include a first hop count measured along the first ringlet and a second hop count measured along the second ringlet.

The path setup initiator 13 receives a bandwidth reservation message from other station devices and examines its source identifier and VLAN identifier fields, thus determining whether the local station device 10 is the egress node of the specified VLAN. If that is the case, then the path setup initiator 13 consults the topology database 12 to retrieve the first and second hop counts measured from the destination station device (i.e., the present station device 10 itself) to the source station device along the first and second ringlets, respectively. Suppose now that the first hop count is smaller than the second hop count. Then the path setup initiator 13 sends a working path setup message back to the source network device over the first ringlet, as well as transmitting a protection path setup message to the same source network device over the second ringlet.

The bandwidth reservation unit 14 establishes a requested path as specified by a working path setup message or a protection path setup message. Specifically, when a working path setup message is received from the first ringlet, the bandwidth reservation unit 14 reserves bandwidth on the second ringlet to establish a working path of the specified VLAN. When a protection path setup message is received from the second ringlet, the bandwidth reservation unit 14 reserves bandwidth on the first ringlet to establish a protection path for the specified VLAN. Note that, in both cases, a path is established in the opposite direction to the message-carrying ringlet. That is, a path will be established on the first ringlet if the request message is received from the second ringlet, and on the second ringlet if the message is received from the first ringlet. The bandwidth reservation unit 14 reserves bandwidth for each path in this way.

The bandwidth/link manager 15 updates and manages information about reserved bandwidth of VLANs with each received bandwidth reservation message. As will be described later, the bandwidth/link manager 15 maintains a bandwidth table for this purpose. The bandwidth/link manager 15 also receives a working path setup message or a protection path setup message of a specific VLAN and uses them to update link parameters of every link constituting the ring network. The link parameters of a link indicate whether that link serves as part of a working path or a protection path of a VLAN. A link table is employed for this purpose, as will be described later.

The amount of reserved bandwidth may differ from path to path. Also the amount of available best-effort traffic bandwidth may differ from link to link. If both of the above are true, the traffic controller 16 defines a best-effort traffic bandwidth by choosing a minimum available bandwidth of all links. More details of traffic control will be provided later.

Communications System

Figure 2:
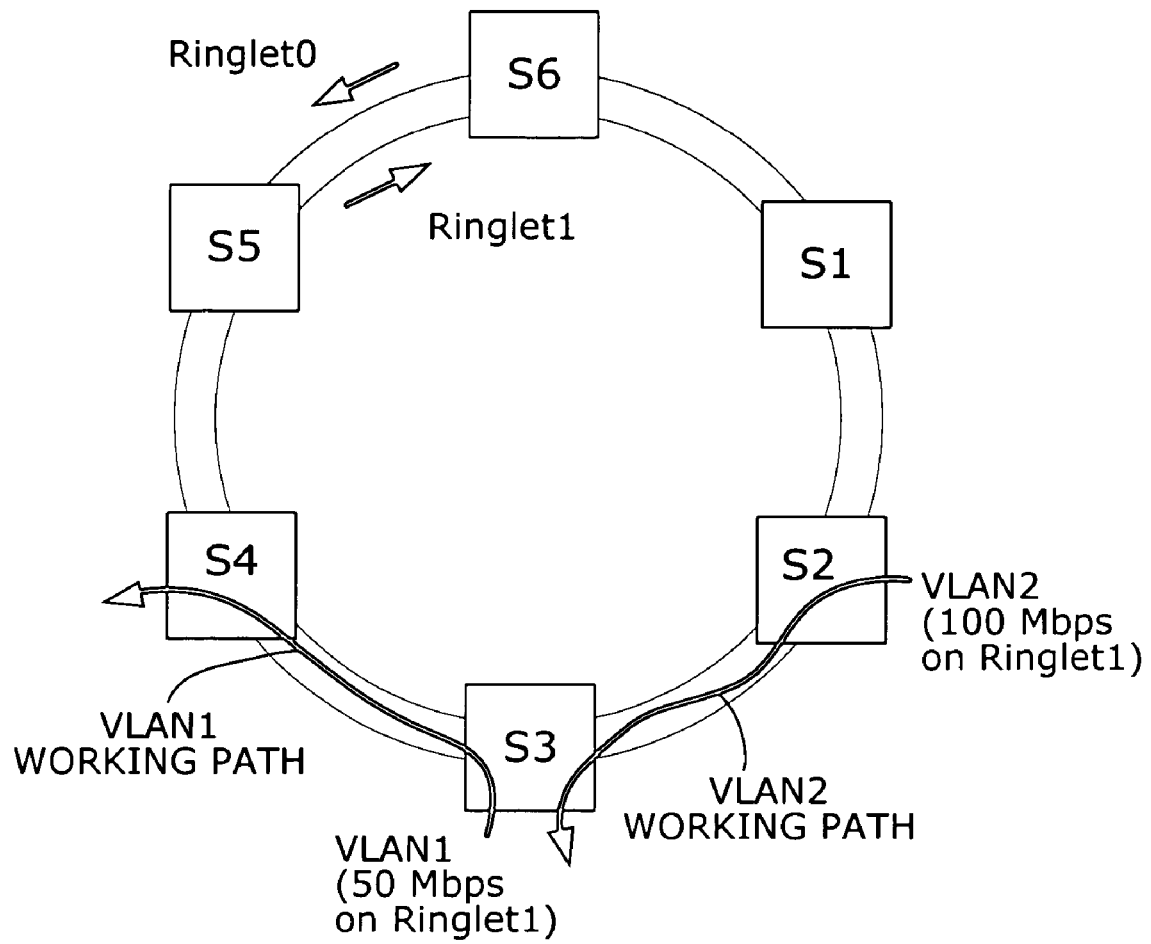
FIG. 2 is an overall block diagram of a communications system.

FIG. 2 is an overall block diagram of a communications system 1, in which the station devices 10-1 to 10-*n* of FIG. 1 are renamed as stations S1 to Sn. Those stations S1 to S6 are interconnected in a dual ring topology. The two rings are named Ringlet0 and Ringlet1. Data traffic flows counter-clockwise on Ringlet0, and clockwise on Ringlet1. Each ringlet has a capacity of 100 Mbps.

Suppose now that VLAN1 needs a bandwidth of 50 Mbps, and that VLAN2 needs a bandwidth of 100 Mbps. While FIG. 2 only shows their working paths, VLAN1 and VLAN2 also have their respective protection paths with the same capacities on the other ring. The following explanation focuses on how to set up a VLAN1 path.

The working path of VLAN1 leaves the source station S3 and goes along Ringlet1 to the destination station S4. The protection path, on the other hand, is a roundabout path on Ringlet0, from the same source station S3 to the same destination station S4. Similarly, the working path of VLAN2 leaves the source station S2 and goes along Ringlet1 to the destination station S3. Its corresponding protection path runs along Ringlet0, from the same source station S2 to the same destination station S3.

The operator of this communications system 1 reserves a required bandwidth of a path by configuring the ingress station of that path. Specifically, the desired bandwidth of VLAN1 will be set in the station S3, and that of VLAN2 will be set in the station S2. Now that the desired bandwidth has been given to the source stations S3 and S2, their respective bandwidth reservation initiators 11 broadcast a bandwidth reservation message to their adjacent stations. Both ringlets are used in this broadcast, and the transmitted message propagates to all stations. Each station forwards received bandwidth reservation messages from east port to west port, as well as from west port to east port.

Figure 3:
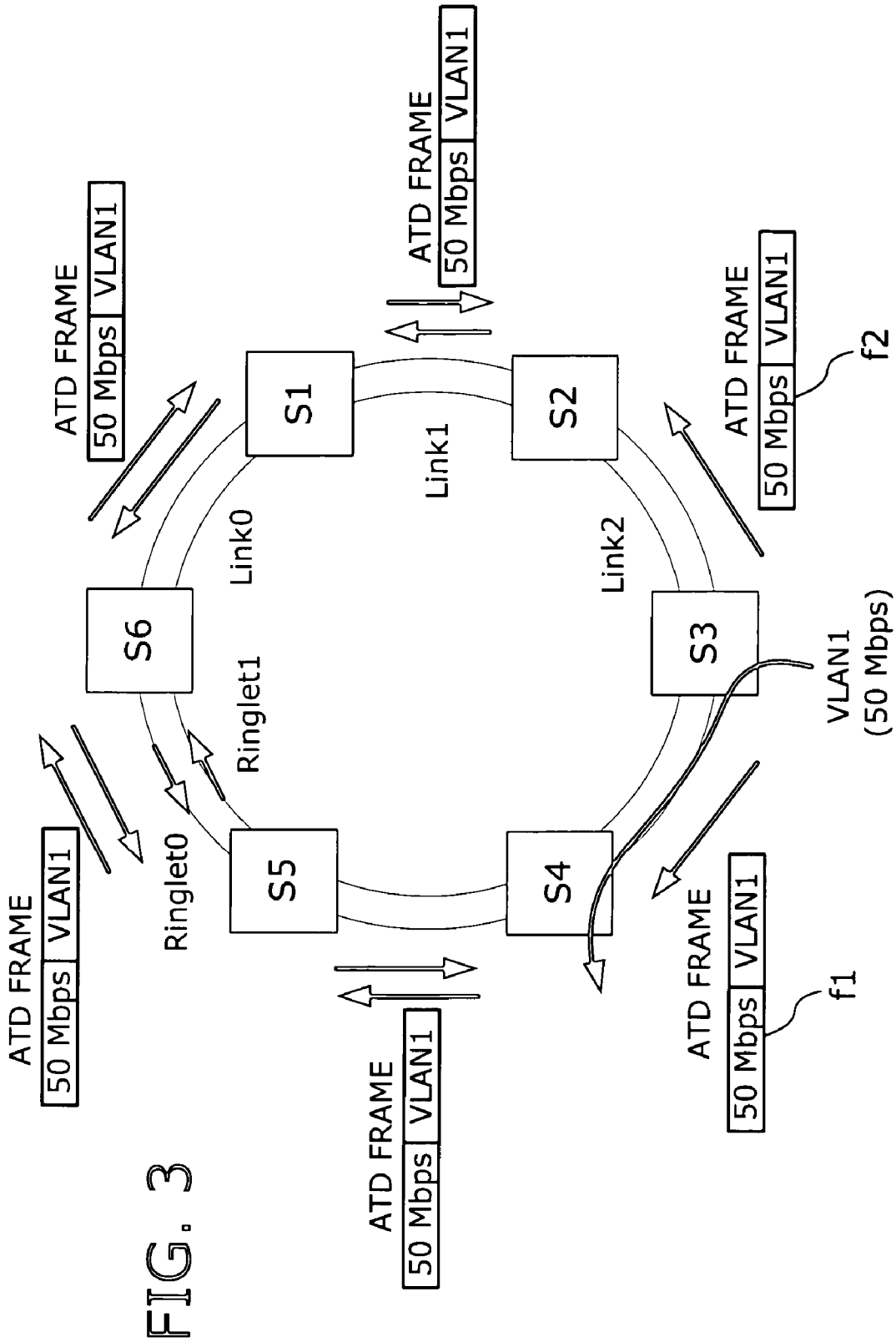
FIG. 3 shows ATD frames spread information about bandwidth requirements of VLAN1.

Bandwidth reservation messages are carried by packets called attribute discovery (ATD) frames. ATD frames have data fields carrying a source identifier, reserved bandwidth, and VLAN ID. FIG. 3 shows how ATD frames spread information about bandwidth requirements of VLAN1. Note that the source identifier field of ATD frames is not depicted in FIG. 3. The source station S3 broadcasts an ATD frame to both ringlets. More specifically, ATD frames f1 and f2 are sent out to Ringlet1 and Ringlet0, respectively. Likewise, another source station S2 broadcasts a VLAN2 bandwidth reservation message in both directions in the same way as in the case of VLAN1.

Bandwidth Table Configuration

Figure 4:
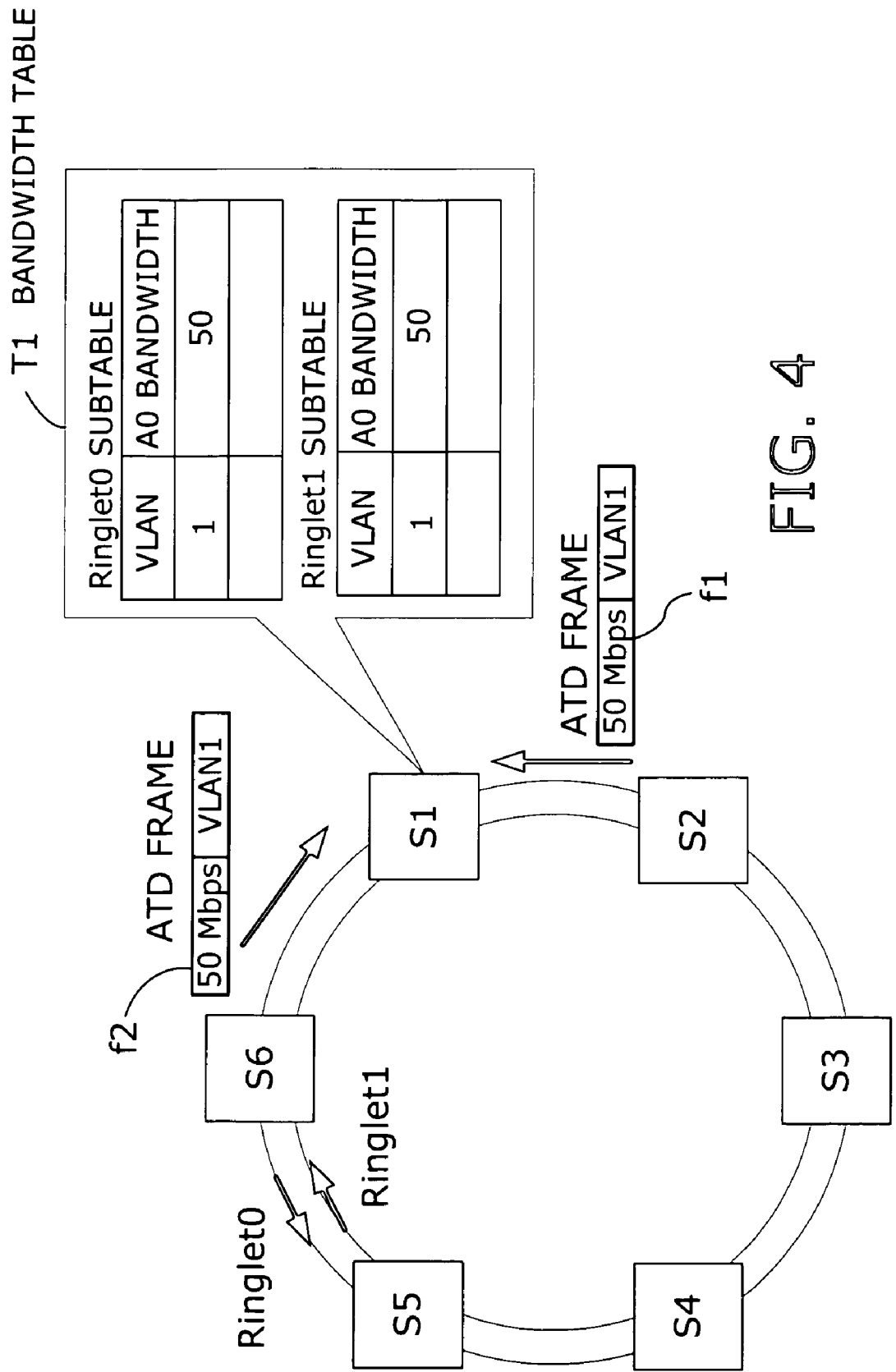
FIG. 4 shows a bandwidth table.

When an ATD frame is received, the bandwidth/link manager 15 in the receiving station updates its own bandwidth table with the values of reserved bandwidth and VLAN ID. FIG. 4 shows the contents of a bandwidth table T1 in a remote station S1, which has received ATD frames from its neighboring stations. The illustrated bandwidth table T1 is actually formed from two subtables, one for Ringlet0 and the other for Ringlet0. Upon receipt of an ATD frame f1 through Ringlet0, the station S1 extracts data fields describing VLAN ID=1 and its corresponding Class-A0 bandwidth value of 50 Mbps. The station S1 then updates its local bandwidth table T1 by writing the extracted parameters into the Ringlet0 subtable.

The station S1 also processes another ATD frame f2 received through Ringlet1 in a similar way. That is, the station S1 finds VLAN ID=1 and its Class A0 bandwidth value of 50

Mbps in the received frame f2. The station S1 then updates its bandwidth table T1 by writing the extracted parameters into the Ringlet1 subtable.

Path Usage Determination

Figure 5:
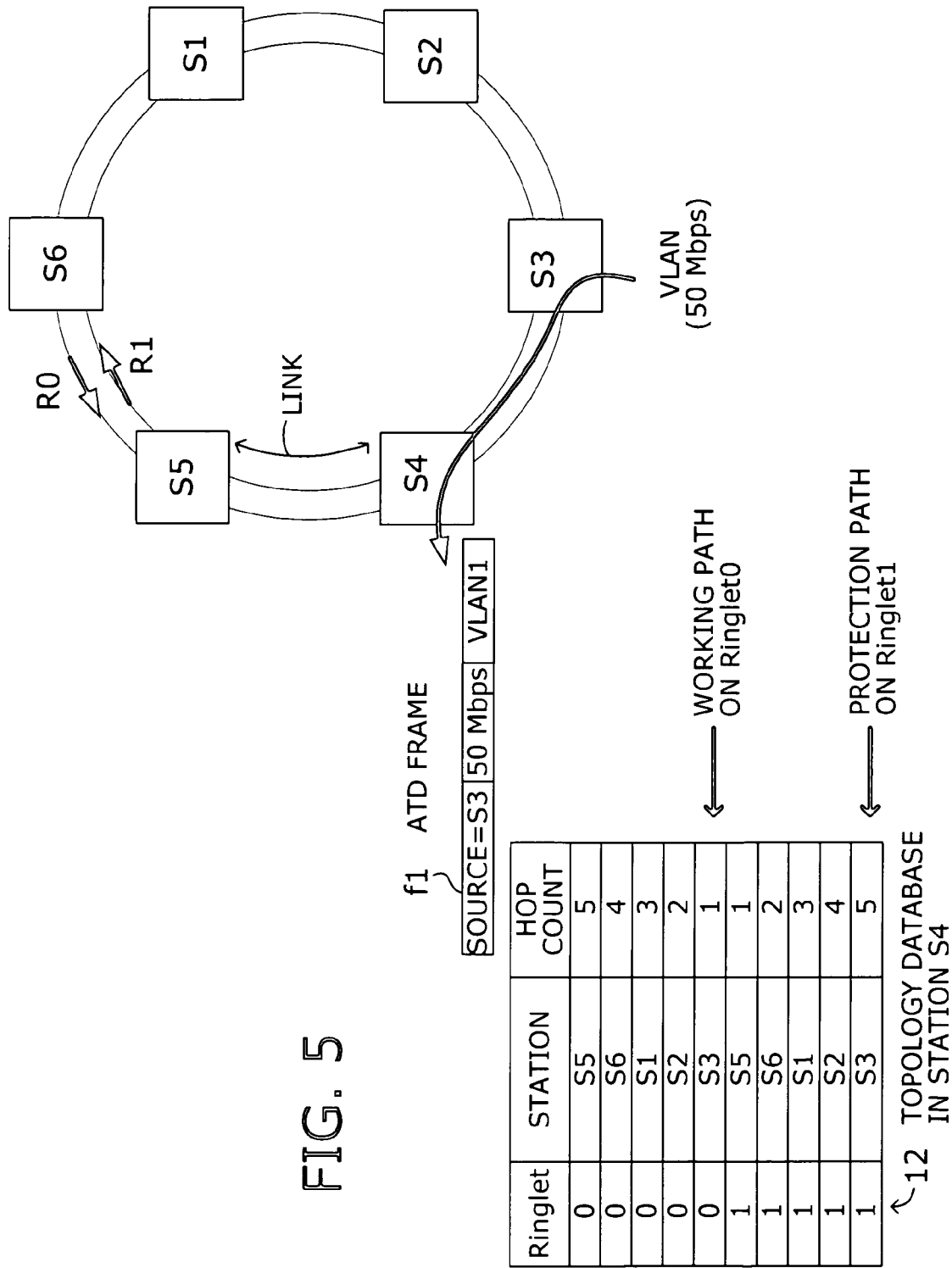
FIG. 5 shows how a working path and a protection path are determined.

FIG. 5 shows how a working path and a protection path are determined. When an ATD frame arrives at the egress station S4 of VLAN1, its local path setup initiator 13 determines where to place a working path and a protection path. The station S4 knows that the station S3 is the only station that is supposed to have a VLAN1 connection to the station S4 itself. For this reason, the station S4 can immediately recognize itself as being the egress node of VLAN1 from the fact that the received ATD frame f1 contains a source identifier of S3 and a VLAN ID of "VLAN1." The source identifier tells the path setup initiator 13 which station is the ingress node of VLAN1, which is S3 in the present example. The path setup initiator 13 then consults the topology database 12 to obtain the hop counts of the ingress station S3 measured along Ringlet0 and Ringlet1.

The topology database 12 in a station stores hop count information for each of Ringlet0 and Ringlet1, showing how many links have to be traversed to reach other stations. In the case of station S4, its topology database 12 gives a hop count value of one in the entry of Ringlet0 and station S3, meaning that the station S3 is just one link away from the present station S4. The topology database 12 also contains a hop count value of five in the entry of Ringlet1 and station S3, meaning that five links have to be traversed to reach the station S3.

Since the hop count of Ringlet0 is smaller than that of Ringlet1, the path setup initiator 13 in the egress station S4 places a working path setup message on Ringlet0 (also referred to as the "first ringlet") so that the ingress station S3 can receive them. The path setup initiator 13 further places a protection path setup message on Ringlet1 (also referred to as the "second ringlet"), so that the ingress station S3 can receive them from the opposite direction.

Figure 6:
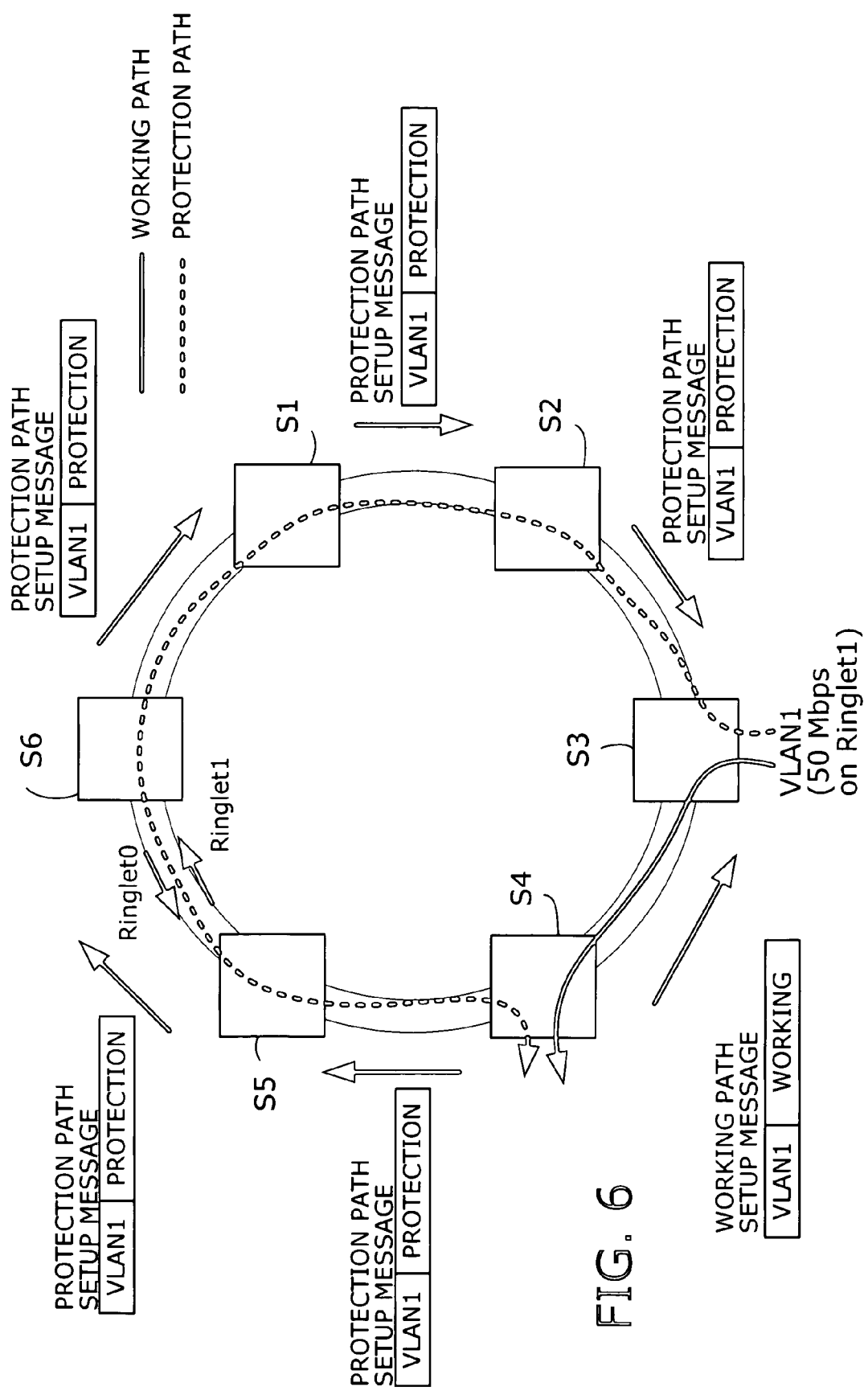
FIG. 6 shows how working path setup messages and protection path setup messages are delivered.

FIG. 6 shows how a working path setup message and a protection path setup message are delivered. A working path setup message is sent from the egress station S4 to the ingress station S3 through Ringlet0 (first ringlet). A protection path setup message, on the other hand, travels a long way along Ringlet1 (second ringlet) to reach the ingress station S3.

Figure 7:
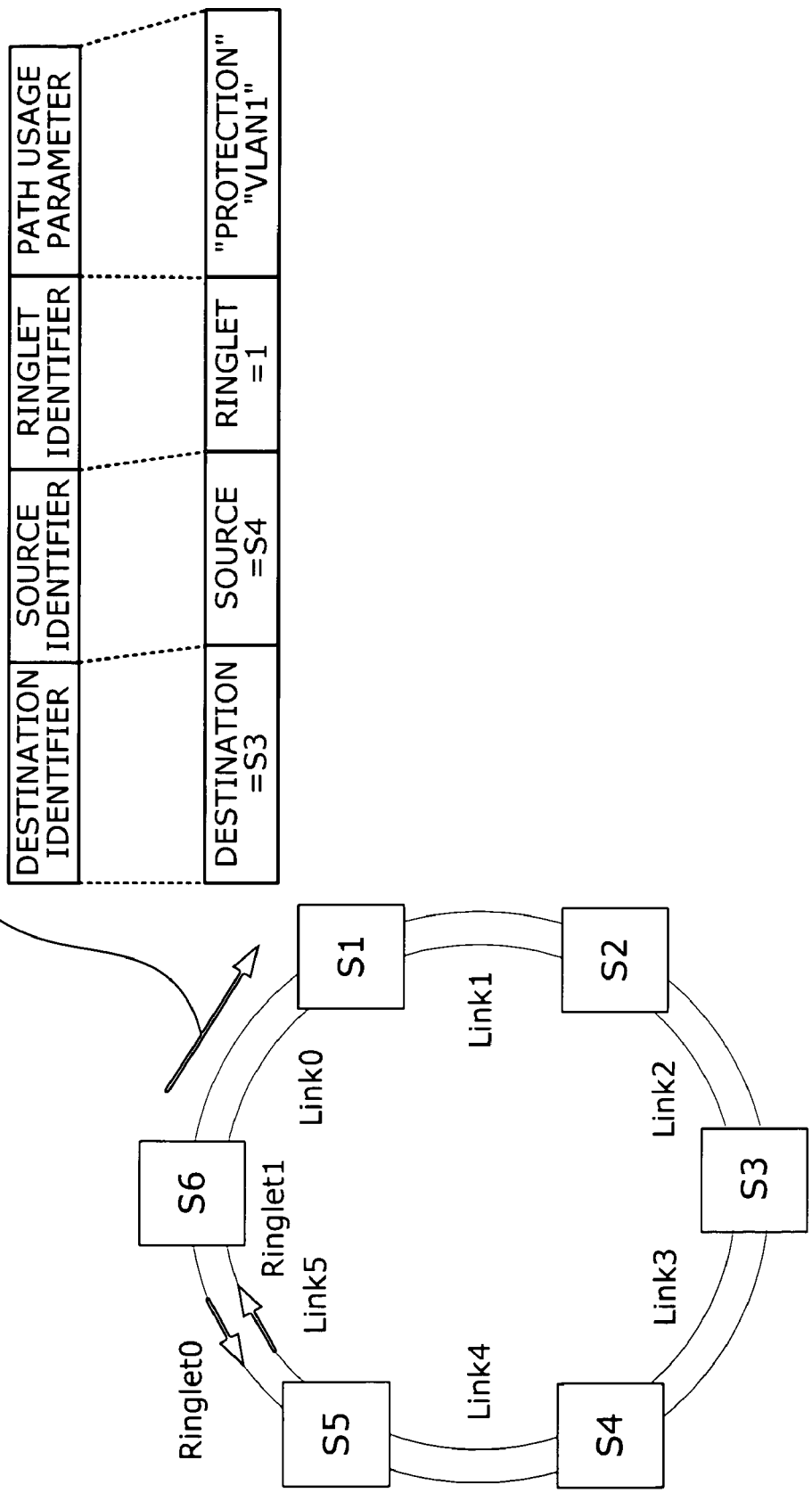
FIG. 7 shows a protection path setup message propagating toward a station.

FIG. 7 shows a protection path setup message propagating toward a station S1. The path setup initiator 13 in the source station S4 has sent this protection path setup message to carry the following data items: destination identifier, source identifier, ringlet identifier, and path usage parameter. The path usage parameter field specifies whether to set up a working path or a protection path. It also indicates which VLAN the path should serve.

In the present example of FIG. 7, the destination and source identifier fields carry the values of "S3" and "S4," respectively, since the protection path setup message has been addressed from the source station S4 to the destination station S3. Also, the ringlet identifier field contains a value of "1" since the message has been placed on Ringlet1. The path usage parameter field specifies "protection" and "VLAN1," meaning that the message is intended for establishing a VLAN1 protection path.

Note that the path usage specified in a message received through a certain ringlet is opposite to the actual usage of that ringlet. For example, if a protection path setup message is received from Ringlet1, it means that Ringlet1 will be used as a working path. Therefore, the bandwidth reservation unit 14 in the receiving station S1 interprets the protection path setup message shown in FIG. 7 as specifying that Ringlet1 be used as a VLAN1 working path, and that the opposite ringlet, Ringlet0, be used as a VLAN1 protection path. The bandwidth reservation unit 14 in the station S1 then configures the opposite ringlet, Ringlet0, so that it will serve as part of the specified protection path.

It should also be noted that the working path setup message and protection path setup message are both addressed from the egress station to the ingress station. The source and destination of those messages are opposite to the source node and destination node of a new path to be established. Think of, for example, a protection path setup message carrying a destination identifier of S3 and a source identifier of S4. This means that a protection path is supposed be routed, not from S4 to S3, but from S3 to S4. Likewise, if a working path setup message carries a destination identifier of S3 and a source identifier of S4, it means that a working path is supposed to be routed from S3 to S4.

After all, the protection path setup message shown in FIG. 7 informs the receiving station S1 that a VLAN1 protection path will be routed from S3 to S4 on Ringlet0. The bandwidth reservation unit 14 in the station S1 consults its own topology database 12 to know how the stations are arranged in the present ring network. The bandwidth reservation unit 14 is thus able to reserve bandwidth for the VLAN1 protection path. More specifically, it registers this protection path with a link table T2 (described in the next section). In the example of FIG. 7, the protection path has to have a capacity of 50 Mbps as previously announced by ATD frame broadcasting. The bandwidth reservation unit 14 can retrieve this bandwidth requirement by consulting its local bandwidth table T1.

Management of Bandwidth Table and Link Table

FIGS. 8A and 8B show the bandwidth table T1 and link table T2 managed by the bandwidth/link manager 15 in the station S1. The illustrated link table T2 has the following link parameter fields: "Link," "VLAN (working)," "VLAN (protection)," and "Ringlet." The link field contains a link identifier (see FIG. 7). The stations exchange link parameters contained in their respective link tables T2 when any change is made to the table entries, thereby keeping a common set of latest link parameters in their respective link tables T2.

Specifically, the topmost entry k0 of the link table T2 shows that Link0 of Ringlet0 serves as part of protection paths of VLAN1 and VLAN2. Another entry k1 indicates that Link2 of Ringlet1 is used as a VLAN2 working path. Yet another entry k2 shows that Link3 of Ringlet0 serves as part of a VLAN2 protection path. Other entries can be interpreted in a similar way. As can be seen from this example, the link table T2 and bandwidth table T1 permit each station to manage the Class A0 bandwidth for each link and each path (or each VLAN).

It may be noticed that the Ringlet0 subtable of the bandwidth table T1 has been emptied. This means that the station S1 has updated its bandwidth table T1 to reflect the fact that the reserved 50 Mbps and 100 Mbps are assigned to the protection paths of VLAN1 and VLAN2, respectively. The bandwidth table T1 only maintains entries of the Ringlet1 subtable representing reserved bandwidth of each VLAN's working path.

Figure 9:
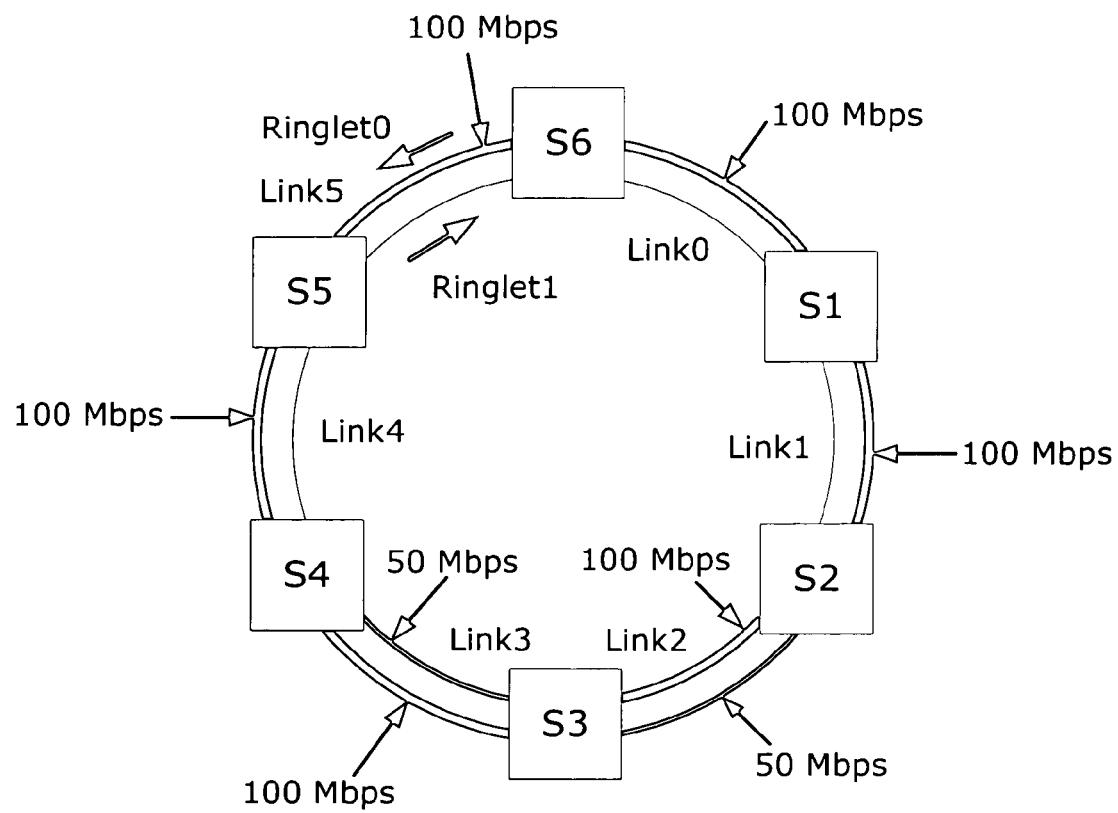
FIG. 9 shows the reserved bandwidth of every link.
Figure 10:
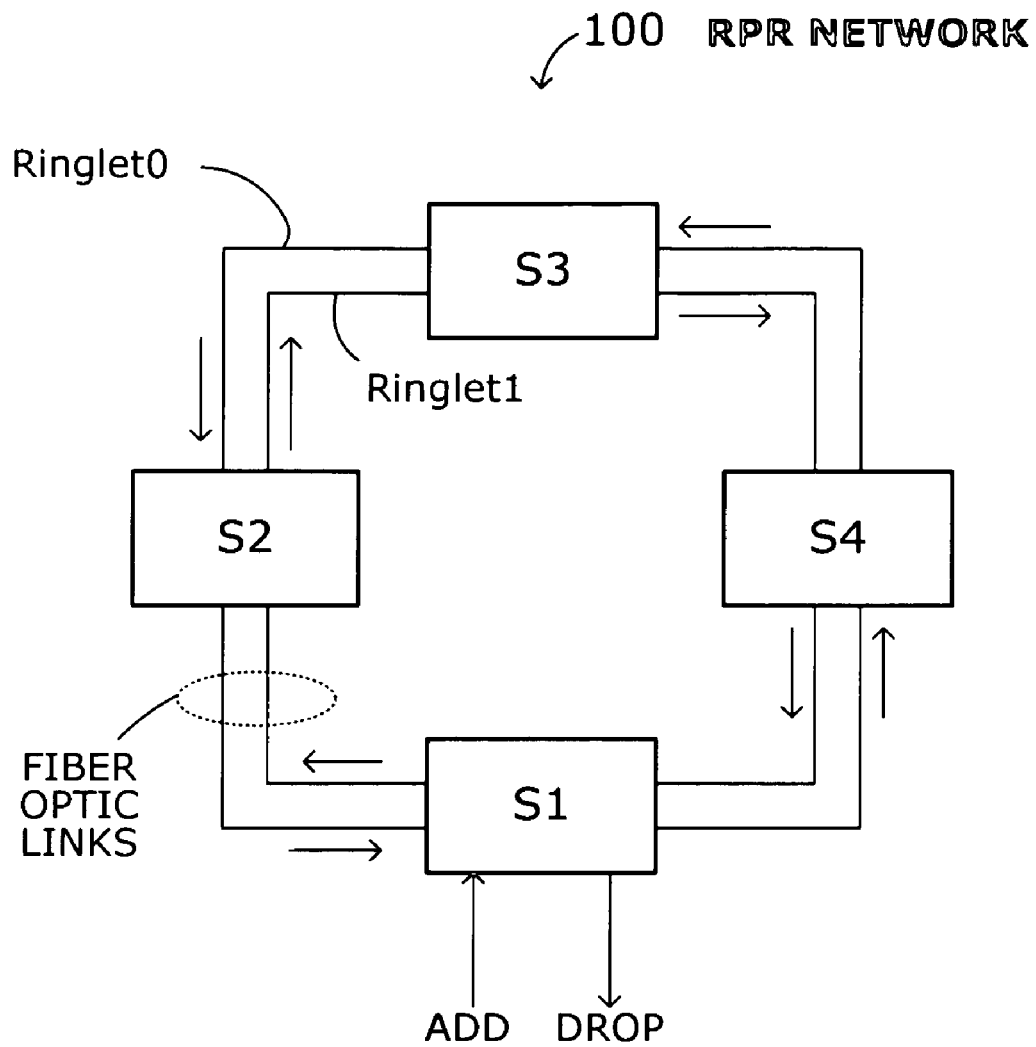
FIG. 10 provides an overview of an RPR network.
Figure 12:
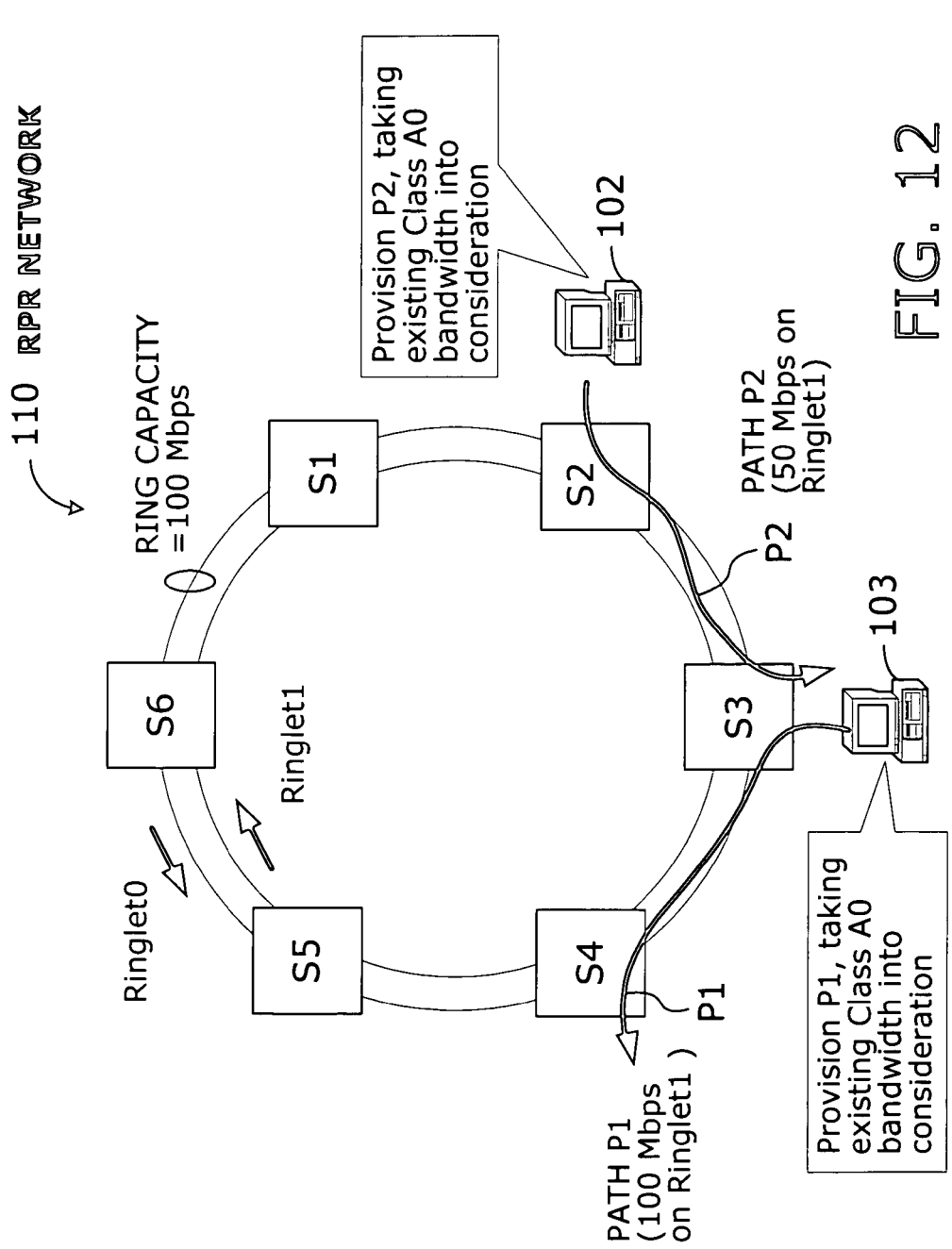
FIG. 12 shows a conventional way of reserving bandwidth.
Figure 13:
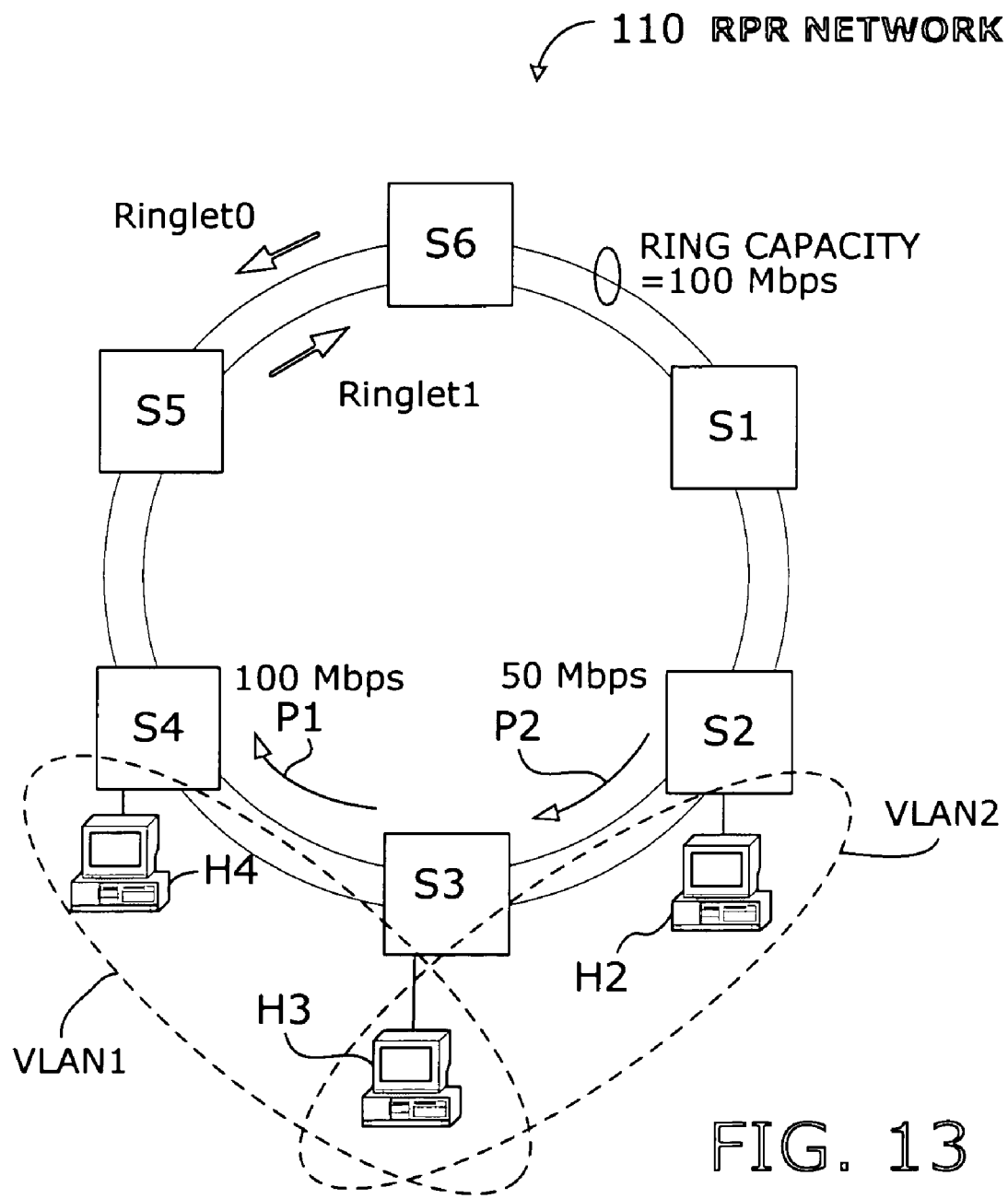
FIG. 13 shows a problem of conventional bandwidth reservation.

FIG. 9 shows the reserved bandwidth of every link. As can be seen from the bandwidth table T1 of FIG. 8A and the link table T2 of FIG. 8B, the VLAN2 working path runs on Link2 of Ringlet1, and 100 Mbps is thus reserved for that Link2. The VLAN1 working path, on the other hand, runs on Link3 of Ringlet1, and 50 Mbps is thus assigned to that Link3.

Link0 of Ringlet0 is used by both VLAN1 and VLAN2 to provide their protection paths. VLAN1 would be switched to its protection path in the event of failure in Link3 of Ringlet1. Likewise, VLAN2 would be switched to its protection path in the event of failure in Link2 of Ringlet1. The protection path of VLAN2 overlaps with that of VLAN1, and VLAN2 takes up a greater bandwidth (100 Mbps) than VLAN1. In such a case, reserving 100 Mbps on Ringlet0 would suffice for all VLAN paths. Details will be discussed in the next section.

Bandwidth Reservation for Protection Paths

Bandwidth of working paths should be fully reserved in all links constituting them. In the present example, both VLAN1 working path (S3 to S4) and VLAN2 working path (S2 to S3) are allocated independent bandwidth resources. The present embodiment, however, takes a different approach for protection paths. Specifically, the present embodiment determines the total amount of bandwidth reservation for protection paths by taking potential failure points of each VLAN into consideration. The term "potential failure point" refers to a point on the network at which a link failure would cause a failover of VLAN.

More specifically, it appears, in the above example, to be necessary to reserve 150 Mbps on Link0 of Ringlet0 since Link0 must provide bandwidth to both VLAN1 and VLAN2 protection paths. It should be noticed, however, that the potential failure point of VLAN1 is Link3, whereas that of VLAN2 is Link2. Failure of VLAN1 does not affect VLAN2, and vice versa. This fact suggests that there is no need for VLAN1 and VLAN2 to keep full spare bandwidth since it is quite unlikely that both VLANs fail at the same time. Because the bandwidth requirement of VLAN2 is larger than that of VLAN1 in the present example (100 Mbps>50 Mbps), a 100-Mbps reservation of VLAN2 could also be used to back up VLAN1 in the event of failure. Conventional systems, however, simply reserve every provisioned bandwidth along both ringlets, thus failing to make efficient use of bandwidth resources.

According to the present embodiment, the amount of protection bandwidth reservation is calculated on an individual link basis. Although two or more protection paths may share a single link, it does not always mean that the link is required to provide all those protection paths concurrently. Rather, the concurrence of protection paths depends on whether they share a potential failure point. In the example shown in FIGS. 8 and 9, a failure in Link2 would not cause failover of VLAN1. Rather, Link0 is only required to back up VLAN2 in that event. Therefore, the present embodiment first enumerates every possible concurrent protection path running on a link, taking into consideration all potential failure points of VLAN paths. The present embodiment then selects, from among the enumerated paths, a widest protection path on that link and reserves as much bandwidth as the selected protection path requires.

As can be seen from the above explanation, the communications system 1 of the present embodiment is designed to reserve Class-A0 bandwidth on an individual path (or individual VLAN) basis. Conventional communications systems consume excessive bandwidth in an attempt to reserve all required Class-A0 bandwidth regardless of their actual routes, thus hampering addition of new paths or causing other problems. Unlike such conventional systems, the proposed communications system 1 eliminates the need for superfluous bandwidth reservation because of its advantageous features of path-based reservation and link management. The bandwidth resources can be used more efficiently since the communications system 1 reserves bandwidth of protection paths by taking into consideration which paths would be switched in the event of link failure. The present invention therefore contributes to an improved operability of an RPR network.

Best-Effort Traffic Control

The present embodiment provides a traffic controller 16 to support best-effort traffic control. Since best-effort traffic is called "fairness eligible traffic" in the RPR terminology, the latter term will be used in the following section.

The communications system 1 transports fairness eligible traffic using non-reserved bandwidth resources of the network. Referring back to FIG. 9, suppose that each ringlet has a capacity of 150 Mbps. VLAN1 takes up 50 Mbps out of the Ringlet1 capacity for its working path (S3 to S4, clockwise), besides reserving 50 Mbps out of the Ringlet0 capacity for its protection path (S3 to S4, counterclockwise). The bandwidth remaining on Link2 of Ringlet0 is therefore 100 Mbps, which is available for fairness eligible traffic.

Also, VLAN2 takes up 100 Mbps out of the Ringlet1 capacity for its working path (S2 to S3, clockwise), besides reserving 100 Mbps out of the Ringlet0 capacity for its protection path (S2 to S3, counterclockwise). The bandwidth remaining on Link1 of Ringlet0 is 50 Mbps, which is available for fairness eligible traffic.

Suppose now that station S3 needs to send station S2 a certain amount of fairness eligible packets. The sending station S3 can send out this traffic at 100 Mbps since Link2 of Ringlet0 allows it. However, the next hop, (i.e., Link1) only provides a capacity of 50 Mbps for fairness eligible traffic. Because of this bottle neck, one half of the transmitted packets are discarded at the next station S2, the lost packets being equivalent to 50 Mbps.

As the above example shows, different fairness eligible capacities of adjacent links would lead to a packet loss problem. To address the problem, the present embodiment places an upper limit to fairness eligible traffic on each ringlet. In short, the upper limit will be determined as a minimum available bandwidth of all links.

Fairness eligible traffic is only allowed to use a fraction of the capacity of each link, the amount of which is calculated by subtracting existing Class-A0 bandwidth from the original ring capacity. The more the Class-A0 traffic reserves, the less the fairness eligible traffic can use. The traffic controller 16 therefore scans the bandwidth table T1 and link table T2 to find a maximum reservation of Class A0 bandwidth. This maximum bandwidth reservation is then used to determine an upper limit of fairness eligible traffic.

Referring again to FIGS. 8A and 8B, VLAN2 reserves 100 Mbps for use as its working path, which is the largest consumer of the Ringlet1 bandwidth. The largest consumption on Ringlet0 is also 100 Mbps, which is reserved by VLAN2 for use as a protection path. Since the original network capacity is 150 Mbps per ringlet, the traffic controller 16 determines that the fairness eligible traffic must be limited to 50 Mbps. This upper limit applies to all links on both Ringlet0 and Ringlet1.

As can be seen from the above discussion, the traffic controller 16 is designed to determine a minimum bandwidth available for fairness eligible traffic. This is achieved by scanning all links to find a maximum reserved bandwidth and subtracting that maximum reserved bandwidth from the original ring capacity. This feature of the traffic controller 16 prevents fairness eligible packets from being lost in the middle of their travel over ringlets, even in the case where the remaining bandwidth differs from link to link because of the unevenness of path bandwidth reservations.

Advantages

As can be seen from the preceding discussion, the present invention offers the following advantages:

Class-A0 bandwidth can be reserved on an individual path basis, thus enabling efficient use of bandwidth resources.

Information on Class-A0 bandwidth can be managed and reported on an individual path basis.

Bandwidth reservation applies, not only to working paths, but also to protection paths for improved availability.

A database is provided to manage the information about which links constitute each working and protection path. This database allows every station to see which stations each path traverses.

Packet loss is minimized in transport of fairness eligible traffic.

CONCLUSION

According to the communications system of the present invention, the egress station of a network path will determine which ringlet to use to set up a working path, by comparing hop counts of the ingress station measured in different ring directions. The egress station sends a working path setup message to a first ringlet with a smaller hop count, and a working path setup message to a second ringlet with a larger hop count. Those messages are addressed to the ingress station. When a working path setup message is received from the first ringlet, the receiving station reserves bandwidth on the second ringlet to establish a working path of the specified logical network segment. When a protection path setup message is received from the second ringlet, the receiving station reserves bandwidth on the first ringlet to establish a protection path of the specified network. The proposed mechanism permits efficient use of bandwidth resources by reserving them on an individual path basis, besides improving operability of ring networks.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communications system transporting data over a redundant ring network formed from first and second ringlets running in opposite directions, the system comprising:

(a) a plurality of station devices, each comprising:

a bandwidth reservation initiator that sends out a bandwidth reservation message in both ring directions to announce how much bandwidth should be reserved for a network path, the bandwidth reservation message containing a source identifier, a logical network identifier, and a bandwidth reservation value, a topology database that manages hop counts of other station devices on the ring network, the hop counts including first hop counts measured along the first ringlet and second hop counts measured along the second ringlet, a path setup initiator that examines a source identifier and logical network identifier in a bandwidth reservation message received from other station devices, thereby recognizes that the local station device is an egress node of a logical network segment specified in the received bandwidth reservation message, consults the topology database to retrieve the first and second hop counts of the source station device of the received bandwidth reservation message, and, if the retrieved first hop count is smaller than the retrieved second hop count, sends a working path setup message back to the source network device over the first ringlet, as well as transmitting a protection path setup message to the same source device over the second ringlet, and a bandwidth reservation unit that reserves bandwidth on the second ringlet to establish a working path of the specified logical network segment when a working path setup message is received from the first ringlet, and reserves bandwidth on the first ringlet to establish a protection path of the specified network when a protection path setup message is received from the second ringlet; and (b) a plurality of transmission media interconnecting the station devices to form the first and second ringlets.

2. The communications system according to claim 1, wherein:

the station device further comprises a bandwidth/link manager comprising a bandwidth table and a link table;

the bandwidth/link manager updates the bandwidth table with each received bandwidth reservation message to maintain latest information about reserved bandwidth of each logical network segment; and the bandwidth/link manager updates the link table with each received working path setup message and protection path setup message to maintain link parameters for each link of the first and second ringlets, wherein the link parameter of a link indicates whether that link is used as part of a working path or as part of a protection path of a particular logical network segment.

3. The communications system according to claim 1, wherein the working path setup message and protection path setup message produced by the path setup initiator include at least one of:

a destination identifier, a source identifier, a ringlet identifier, and a path usage parameter specifying which logical network segment to establish, as well as indicating whether the specified path is used as a working path or as a protection path of that logical network segment.

4. The communications system according to claim 3, wherein:

the bandwidth reservation unit establishes a path with as large bandwidth as specified by the bandwidth reservation value in the previously received bandwidth reservation message;

the established path serves as a working path or protection path as specified by the received path usage parameter;

the established path is oriented in an opposite direction to what the received destination and source identifiers suggest; and the established path runs on an opposite ringlet to what the received ringlet identifier suggests.

5. The communications system according to claim 1, wherein the station device further comprises a traffic controller that defines a best-effort traffic bandwidth by choosing a minimum available bandwidth of all links in the case where the amount of reserved bandwidth differs from path to path and where the amount of available best-effort traffic bandwidth differs from link to link.

6. The communications system according to claim 1, wherein the bandwidth reservation unit determines the amount of bandwidth for the protection path by calculating a maximum amount of total reserved bandwidth that must be switched at the same time in the event of failure.

7. A network device for use in a redundant ring network formed from first and second ringlets running in opposite directions, the device comprising:
   a bandwidth reservation initiator that sends out a bandwidth reservation message in both ring directions to announce how much bandwidth should be reserved for a network path, the bandwidth reservation message containing a source identifier, a logical network identifier, and a bandwidth reservation value;
   a topology database that manages hop counts of other station devices on the ring network, the hop counts including first hop counts measured along the first ringlet and second hop counts measured along the second ringlet;
   a path setup initiator that examines a source identifier and logical network identifier in a bandwidth reservation message received from other station devices, thereby recognizes that the local station device is an egress node of a logical network segment specified in the received bandwidth reservation message, consults the topology database to retrieve the first and second hop counts of the source station device of the received bandwidth reservation message, and, if the retrieved first hop count is smaller than the retrieved second hop count, sends a working path setup message back to the source network device over the first ringlet, as well as transmitting a protection path setup message to the same source device over the second ringlet; and
   a bandwidth reservation unit that reserves bandwidth on the second ringlet to establish a working path of the specified logical network segment when a working path setup message is received from the first ringlet, and reserves bandwidth on the first ringlet to establish a protection path of the specified network when a protection path setup message is received from the second ringlet.

8. A method of transporting data using bandwidth reserved on a redundant ring network formed from first and second ringlets running in opposite directions, the method comprising the steps of:
   (a) broadcasting a bandwidth reservation message in both ring directions to announce how much bandwidth should be reserved for a network path, the bandwidth reservation message containing a source identifier, a logical network identifier, and a bandwidth reservation value;
   (b) providing a topology database to manage hop counts of other station devices on the ring network, the hop counts including first hop counts measured along the first ringlet and second hop counts measured along the second ringlet;
   (c) examining a source identifier and logical network identifier in a received bandwidth reservation message, thereby recognizing that the local station device is an egress node of a logical network segment specified in the received bandwidth reservation message;
   (d) consulting the topology database to retrieve the first and second hop counts of the source station device of the received bandwidth reservation message;
   (e) sending a working path setup message back to the source network device over the first ringlet, as well as a protection path setup message to the same source device over the second ringlet, if the retrieved first hop count is smaller than the retrieved second hop count;
   (f) reserving bandwidth on the second ringlet to establish a working path of the specified logical network segment when a working path setup message is received from the first ringlet; and
   (g) reserving bandwidth on the first ringlet to establish a protection path of the specified network when a protection path setup message is received from the second ringlet.

9. The method according to claim 8, further comprising the steps of:
   updating a bandwidth table with each received bandwidth reservation message to maintain latest information about reserved bandwidth of each logical network segment; and
   updating a link table with each received working path setup message and protection path setup message to maintain link parameters for each link of the first and second ringlets, wherein the link parameter of a link indicates whether that link is used as part of a working path or as part of a protection path of a particular logical network segment.

10. The method according to claim 8, wherein the working path setup message and protection path setup message sent in said sending step (e) include at least one of:
   a destination identifier,
   a source identifier,
   a ringlet identifier, and
   a path usage parameter specifying whether to set up a working path or a protection path, as well as indicating which logical network segment the path should serve.

11. The method according to claim 10, further comprising establishing a path with as large bandwidth as specified by the bandwidth reservation value in the previously received bandwidth reservation message, upon receipt of the working path setup message or the protection path setup message;
   the established path serves as a working path or protection path as specified by the received path usage parameter;
   the established path is oriented in an opposite direction to what the received destination and source identifiers suggest; and
   the established path runs on an opposite ringlet to what the received ringlet identifier suggests.

12. The method according to claim 8, further comprising the step of defining a best-effort traffic bandwidth by choosing a minimum available bandwidth of all links in the case where the amount of reserved bandwidth differs from path to path and where the amount of available best-effort traffic bandwidth differs from link to link.

13. The method according to claim 9, further comprising the step of determining the amount of bandwidth for the protection path by calculating a maximum amount of total reserved bandwidth that must be switched at the same time in the event of failure.

* * * * *